United States Patent

Vodehnal

[15] 3,646,515
[45] Feb. 29, 1972

[54] VEHICULAR SAFETY AND REMOTE CONTROL SYSTEM

[72] Inventor: Frank Vodehnal, 1104 West Tri Oaks, Houston, Tex. 77043

[22] Filed: Mar. 2, 1970

[21] Appl. No.: 15,513

[52] U.S. Cl...............................340/64, 180/114, 325/117, 325/314, 340/52 F
[51] Int. Cl......................................B60r 25/04, F02n 17/00
[58] Field of Search................180/114, 77 R; 325/117, 314, 325/37; 340/64, 52 B, 52 D, 52 F, 312; 290/37 A, DIG. 5, DIG. 2

[56] References Cited

UNITED STATES PATENTS

| 3,455,403 | 7/1969 | Hawthorne | 180/114 |
| 3,364,427 | 1/1968 | Bennett | 325/117 |
| 2,952,782 | 9/1960 | Woyden | 290/DIG. 3 |
| 3,414,734 | 12/1968 | Konrad | 180/114 |
| 2,535,162 | 12/1950 | Rodgers | 340/312 |
| 805,714 | 11/1905 | Creveling | 325/37 |
| 1,481,471 | 1/1924 | Londe | 340/52 F |

Primary Examiner—Thomas B. Habecker
Assistant Examiner—Glen R. Swann, III
Attorney—Pravel, Wilson & Matthews

[57] ABSTRACT

Vehicular safety and control system whereby the user upon leaving his vehicle unattended may prevent unauthorized use of his vehicle. Uses which the system makes available are: ceasing unauthorized operation of the engine, preventing unauthorized movement of the vehicle, and indicating whether the use is or is not authorized. The system can also be used to locate the car from among many in a large parking lot or for other location operations, and to start and stop the motor by remote control. This system also protects against engaging the starter of the vehicle once the motor is running.

18 Claims, 1 Drawing Figure

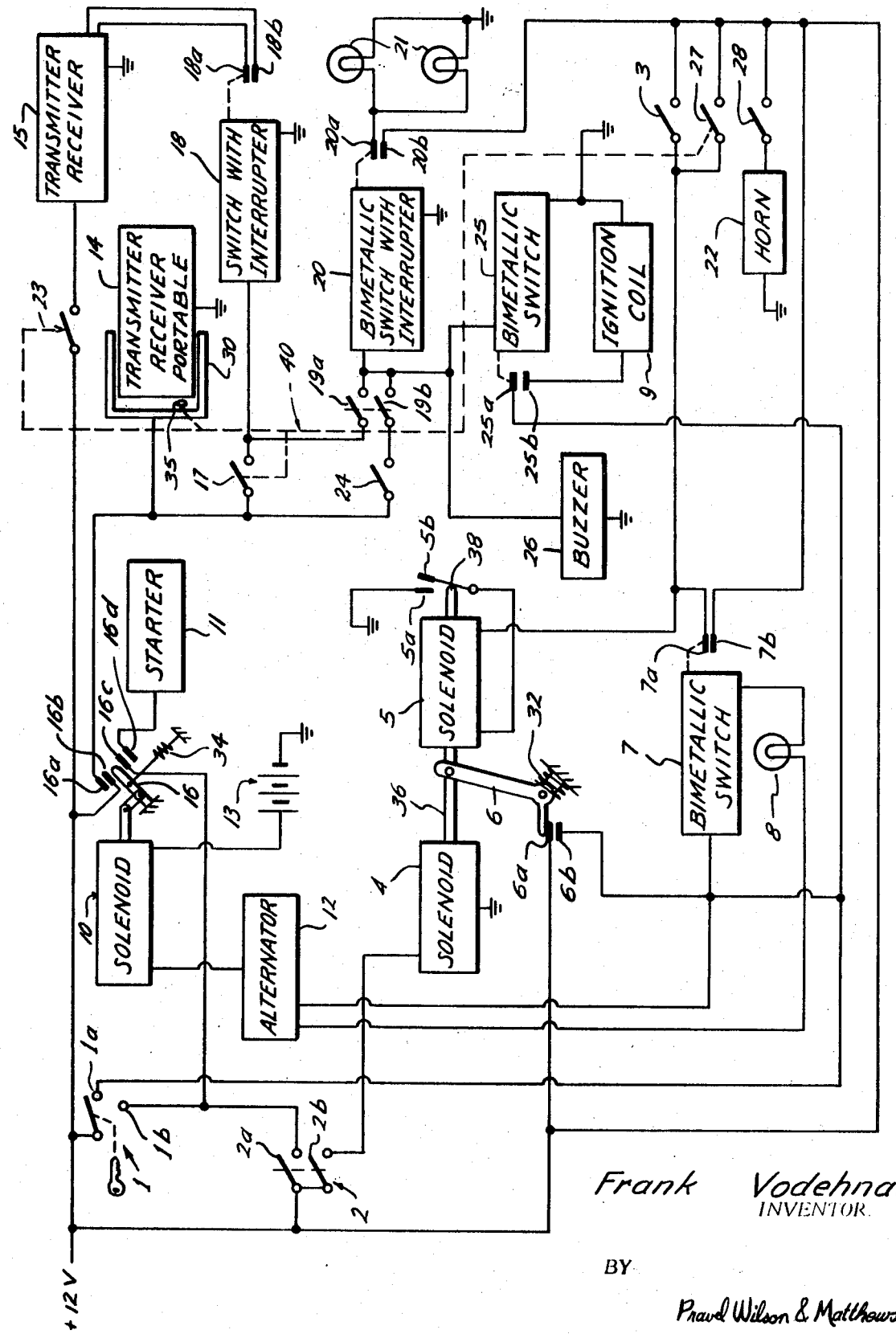

3,646,515

VEHICULAR SAFETY AND REMOTE CONTROL SYSTEM

BACKGROUND OF THE INVENTION

1. Field of the Invention

This invention relates to a new and improved vehicle safety and control system.

2. Description of the Prior Art

In the prior art it is well known that thousands of cars are stolen annually at a cost of millions of dollars.

Vast sums have been expended in an attempt to prevent such thefts but to date most have been unsuccessful in attempts to develop a satisfactory vehicular safety system.

For example there are some systems that have signal systems mounted with the vehicle, but such systems are based on the presumption that passers-by and others will initiate positive assistance or notify the proper authorities upon actuation of the system.

Further, the inconvenience and delay caused in attempting to locate one's vehicle from among many parked together outside a location where numerous people are assembled, for example sporting events or large office building complexes, causes waste of valuable time.

The discomfort caused when waiting in a vehicle in winter for the heater to warm, or in summer for the air conditioner to cool, the interior of the vehicle is well known. It is known to go to the vehicle and start the engine in advance of using the vehicle and then return inside a building in order to allow adjustment of the temperature of the vehicle's interior to a level comfortable to passengers. However, this known method is uncomfortable and inconvenient to the person who must go out into the unpleasant weather to start the vehicle's engine. In addition, if the passengers of the vehicle are attending an event such as theatre, movies, or a sporting event, it is clearly undesirable to leave the event early to start the vehicle engine so that the vehicle will be comfortable for passengers when the event is completed.

Present motor vehicles are so noiseproof in design that it is often difficult to determine if the motor of the vehicle is running. Should the user of the vehicle mistakenly think the motor is not running when it actually is, and attempt to engage the starter, damage can be caused to the flywheel of the starter when it engages the already rotating gear of the engine.

SUMMARY OF THE INVENTION

Briefly, the present invention enables a user of a vehicle to prevent unauthorized use of the vehicle by removing a portable transceiver from a concealed location in the vehicle to actuate mechanisms for preventing unauthorized movement of the motor vehicle. The present invention actuates an alarm indicating that the use of the vehicle is unauthorized, and interrupts the ignition circuit of the vehicle, thereby stopping the vehicle. Other means are provided enabling the user to locate his vehicle from among many cars parked in a single location. Also, the user is able to ignite the engine in advance of his anticipated use of the vehicle, and further to stop the engine should the anticipated use of the vehicle not be required. Additionally, means are provided so that the user of the vehicle is prevented from inadvertently engaging the starter of the vehicle while the motor of the vehicle is running, and from attempting to move the vehicle while the emergency brake is engaged.

It is an object of the invention to provide a new and improved vehicle safety and control system.

It is an object of this invention to provide the user of a vehicle with means to prevent unauthorized movement of his vehicle, and additionally with means which initiates an alarm upon unauthorized attempts to move a vehicle while the owner does not desire it to be moved.

It is an object of this invention to provide the owner of a vehicle with means to start and stop the engine of his vehicle while he is away from the location of his vehicle.

It is further an object of this invention to provide the owner of a vehicle with apparatus to facilitate his locating of that vehicle while the vehicle is one of many parked in a given location.

It is an object of this invention to prevent damage to the vehicle caused by inadvertent engagement of the starter of a motor while the motor is running.

BRIEF DESCRIPTION OF THE DRAWING

Other objects and advantages of the present invention will become apparent as the following detailed description is read in connection with the accompanying drawing of the preferred embodiment of the invention.

DESCRIPTION OF THE PREFERRED EMBODIMENT

Referring to the accompanying drawing which depicts the safety and control system of the present invention, it can be seen that a key switch 1 is a standard vehicle ignition switch and is electrically connected through a contact 1b to a pair of contacts 16c and 16d of a movable switch arm 16 to a starter 11. Key switch 1 is also electrically connected through contact 1a to a contact 6b of a movable arm 6, to an alternator 12, to a bimetallic switch 7 and to a contact 25a of a bimetallic switch 25.

Electrical power from a terminal labeled +12v, which could be the positive terminal of a battery 13, or the positive terminal of another direct current power source, is supplied to key switch 1, a pair of contacts 2a and 2b of an undepicted relay, a contact 3 of another undepicted relay, a switch 27, a contact 28 of another undepicted relay, a contact 20b of a bimetallic switch (with interrupter) 20, a switch 23, a contact 16b of movable switch arm 16, and a contact 7b of a bimetallic switch 7 for energizing the circuit of the present invention.

An electrical contact 2a of double switch 2 is electrically connected to contact 16c of movable switch arm 16, and an electrical contact 2b of double switch 2 is electrically connected to a solenoid 4.

A switch 17, a switch 24 and a receptacle 30 are electrically connected to contact 16a of movable switch arm 16. A button 35 is situated at the base of a receptacle 30 and controls switch 23, switch 17 and switch 27. When button 35 is depressed, switches 23 and 17 are open and switch 27 is closed. A portable transmitter-receiver (transceiver) 14 is adapted to fit into receptacle 30 as illustrated in the drawing. When transceiver 14 is removed from receptacle 30, switches 23, 17 and 27 are caused to actuate. I have found that this can be accomplished in one of two ways. First, button 35, similar to that of the hookswitch of a telephone, is held depressed with transceiver 14 positioned in receptacle 30. On removal of transceiver 14 from receptacle 30, button 35 moves which completes an electrical circuit through a relay (not shown) and the flow of current through this circuit causes switch 23, 17 and 27 to operate thereby closing switches 23 and 17 and opening switch 27.

Alternatively, button 35 could be held by a compressed spring (not shown) or other releasable means when transceiver 14 is positioned in receptacle 30. Removal of transceiver 14 permits the spring to actuate thereby releasing button 35. Button 35 would, through mechanical connection to switches 17, 23 and 27 cause switches 17 and 23 to close and switch 27 to open. The control of button 35 over switches 17, 23 and 27 is symbolically depicted in the accompanying drawing by a dotted line 40.

Replacement of transceiver 14 in receptacle 30 depresses button 35 and causes switches 23 and 17 to open and switch 27 to close. If the electrical alternative hereinabove described is being used, depressing button 35 would break the circuit causing switches 17 and 23 to open and switch 27 to close. If the mechanical alternative hereinabove described is being used, depressing button 35 would compress the spring and return the mechanical connection to the position opening switches 23 and 17 and closing switch 27.

Switch 23 is electrically connected to the receiver portion of a fixed transceiver 15, switch 17 is electrically connected to a switch (with interrupter) 18, so that flow of current through switch 18 serves to alternately open and close contacts 18a and 18b, and switch 17 is further electrically connected through a contact 19a to bimetallic switch (with interrupter) 20, so that flow of current through switch 20 serves after a time delay to alternately open and close contacts 20a and 20b. The contacts 20a and 20b, when closed, supply operating power to the vehicle tail lights, illustrated symbolically at 21.

A switch 24 is electrically connected through a contact 19b to a buzzer (or similar alarm device) 26 and to bimetallic switches 20 and 25, so that flow of current through switch 25 serves after a time delay to open contacts 25a and 25b, which, when open, interrupt electrical power from battery terminal +12v through contact 1a, or 6a and 6b, to an ignition coil 9. As set forth hereinabove, flow of current through switch 20 serves after a short time delay to alternatively open and close contacts 20a and 20b.

Switch 24 will be closed whenever the emergency brake of the vehicle is engaged, while contacts 19a and 19b will be closed upon engagement of the vehicle in gear: that is, an automatic transmission in a gear other than "park" or "neutral," and a standard transmission in a gear other than neutral.

Contact 3 and switch 27 are connected so that when either is closed, electrical power is supplied to a solenoid 5, generating an electromagnetic force which moves a rod 36 and switch arm 6 to a first alternative position, in the direction of solenoid 5. Switch 6 is a two position switch, similar to a standard electrical light switch, held at its base by a spring 32 in the first of its alternative positions after switch 6 has been actuated by solenoid 5. Movement of rod 36 toward solenoid 5 causes an end portion 38 of rod 36 to open the circuit between a pair of contacts 5a and 5b, interrupting the flow of current through solenoid 5 thus protecting solenoid 5 from excess current. However, before interruption of current through solenoid 5 occurs, rod 36 will have moved switch arm 6 sufficiently for spring 32 to lock switch arm 6 in its first operated position thereby opening contacts 6a and 6b, which interrupts the flow of current from power supply terminal +12v to ignition coil 9.

A solenoid 4 is connected to the opposite end of rod 36 from solenoid 5 and is energized upon closure of double switch 2 to contact 2b. Solenoid 4, when energized, exerts an electromagnetic force pulling rod 36 in a direction opposite to the direction of solenoid 5, and such movement of rod 36 causes switch arm 6 to move to the second of its alternative positions, in which position switch arm 6 is again retained by spring 32. When switch arm 6 is held in such second position, arm 6 closes contacts 6a and 6b, allowing operating current to flow from power supply terminal +12v to ignition coil 9.

The closing of contact 28 supplies electrical power to a horn 22 or an alternative location indicating device as will be set forth hereinbelow.

Bimetallic switch 7 and an indicator lamp 8 are electrically connected to contact 6b of switch arm 6 and also to contact 1a of key switch 1, and also to an alternator 12 of the motor vehicle. Upon loss of current from alternator 12, either from failure of the motor to start or some other cause, current will flow from terminal +12v through either contact 1a, or 6a and 6b, into bimetallic switch 7 and indicator lamp 8. Lamp 8 gives a visible indication that ignition coil 9 is receiving current while alternator 12 is not operating. Flow of current through bimetallic switch 7 serves after a time delay to close contacts 7a and 7b thereby permitting flow of current from terminal +12v to solenoid 5 to operate solenoid 5. Solenoid 5 operates and moves rod 36 as set forth hereinabove to open contacts 6a and 6b thereby interrupting the flow of current to ignition coil 9 and protecting the power source from excess current drain.

A solenoid 10 is electrically connected between battery 13 and alternator 12. When alternator 12 is producing current, the current being fed to battery 13 by alternator 12 flows through solenoid 10 causing solenoid 10 to operate and draw movable switch arm 16 to a position closing contacts 16a and 16b, thus feeding power to contacts 17 and 24 and receptacle 30 for transceiver 14. If no current flows through solenoid 10, a spring 34 exerts a force on movable switch arm 16 causing such switch arm to move and close contacts 16c and 16d allowing flow of electrical power, if either contact 2a or 1b is closed, to starter 11. Starter 11 is connected in the conventional manner to its flywheel. To preserve clarity in the drawings, the flywheel has been omitted.

The vehicle to which the present invention has been attached will operate in the manner of the standard motor vehicle under the control of key switch 1 so long as transceiver 14 is inserted in its receptacle 30. Key switch 1, ignition coil 9, starter 11, alternator 12, battery 13 and horn 22 are conventional elements available on motor vehicles, and are well known to those of ordinary skill in the art. Additionally, it is feasible to use as contact 24 the same contact which closes the electrical circuit to give a flashing indication that the emergency brake is engaged; but this is not a requirement of the present invention, as an additional contact could be inserted and used equally as well to serve as contact 24.

STARTER SAFETY FEATURE

Solenoid 10 protects against the user inadvertently engaging starter 11. When the motor is running, after having been started upon actuation of either key switch 1 or closure of contact 2a in the manner hereinafter described, alternator 12 produces current which is fed through solenoid 10 to battery 13, energizing solenoid 10 thereby drawing movable arm 16 to a position closing contacts 16a and 16b thus leaving contacts 16c and 16d open so long as current is being produced by alternator 12. Should the user inadvertently attempt to engage starter 11, once the motor of the vehicle is running, by moving key switch 1 to close contact 1b, starter 11 will receive no current because contacts 16c and 16d are open due to the current from alternator 12 energizing solenoid 10 and drawing movable switch arm 16 to a position whereby such contacts 16c and 16d are open. Similarly, closure of contact 2a with the motor running cannot energize starter 11, because contacts 16c and 16d are open. Since the starter cannot be engaged its flywheel cannot be engaged with the moving gears of the engine, and thereby damaged.

EMERGENCY BRAKE SAFETY FEATURE

One safety feature which the present invention makes available without requiring removal of transceiver 14 from its receptacle 30 in the manner to be hereinafter described, is to protect against attempts to move the vehicle with the emergency brake engaged, thus preventing unnecessary wear of, or possible damage to, the emergency brake of the vehicle. When the emergency brake of the vehicle is engaged, contact 24 is closed. If the motor of the vehicle is running, alternator 12 is producing current energizing solenoid 10 thereby actuating movable switch arm 16 to close contact 16a to 16b. Should the driver inadvertently attempt to engage the vehicle in gear, contacts 19a and 19b will close. Current will now flow from terminal +12v through closed contact 16b and contact 16a, closed contact 24, and closed contact 19b; and from contact 19b through each of buzzer 26, bimetallic switch (with interrupter) 20, and bimetallic switch 25, to electrical ground.

The flow of current actuates buzzer 26 to give an audible indication that the user is attempting to move the vehicle while the emergency brake is engaged, in order that the user may thereupon release the emergency brake. Flow of current through bimetallic switch (with interrupter) 20 serves after a time delay to alternately open and close contacts 20a and 20b, allowing intermittent flow of current from terminal +12v through such contacts to lights 21. The flashing of the lights gives a further alarm indication that the user of the vehicle is attempting to move the vehicle while the emergency brake is engaged. Should the user disregard these alarm indications, the present invention provides a still further safety feature. The flow of current through bimetallic switch 25 will continue so long as the vehicle is in gear with the emergency brake engaged, thereby closing contacts 24, 19a and 19b in the manner hereinabove set forth. Flow of current through bimetallic switch 25 will, after a time delay, cause contacts 25a and 25b to open, opening at these contacts the circuit carrying current to ignition coil 9, and stopping the engine of the vehicle, thereby preventing wear or possible damage to the emergency brake of the vehicle.

UNATTENDED SAFETY FEATURE

Removal of transceiver 14 from transceiver 30 provides a still further safety feature, prevention of unauthorized movement of the vehicle. In order to prevent the person attempting to move the vehicle without authorization from becoming aware that the vehicle is equipped with the present invention, I have found it desirable to locate receptacle 30 in a concealed position within the vehicle, for example, under the seat, or behind the dashboard, or in the glove compartment. To prevent unauthorized movement, the user of the vehicle removes transceiver 14 from concealed receptacle 30, actuating button 35, thereby closing switches 17 and 23 and opening switch 27. Should some other person now start the engine and attempt to move the vehicle, the flow of current through alternator 12 will have energized solenoid 10 to actuate movable switch arm 16 to close contacts 16a and 16b. Engaging the vehicle in gear will in the hereinabove described manner close contact 19a. Current will now flow from terminal +12v through closed contacts 16a and 16b, closed switch 17, closed contact 19a to each of buzzer 26, bimetallic switch 25 and bimetallic switch (with interrupter) 20, to electrical ground. Flow of current through buzzer 26 actuates buzzer 26 giving an audible indication that the movement of the vehicle is unauthorized. Flow of current through bimetallic switch (with interrupter) 20 serves after a time delay to intermittently open and close contacts 20a and 20b, energizing tail lights 21 in the hereinabove described manner. The purpose of the time delay is to prevent the unauthorized user from being aware that the lights are flashing. Flow of current through bimetallic switch 25 serves after a time delay to open contacts 25a and 25b preventing energization of vehicle ignition coil 9 in the hereinabove discussed manner, and stops the engine of the vehicle.

UNATTENDED CONTROL FEATURES

Removal of transceiver 14 from its concealed receptacle 30 permits the user of the vehicle to exercise control operations over such vehicle while the user of the vehicle is away from the immediate vicinity of such vehicle. Any one of numerous well-known portable transceivers is suitable for the purposes of the present invention, but it should be capable of transmitting one distinctive frequency for each one of the three control operations, to be hereinafter set forth, which is desired. If less than three control operations are necessary, correspondingly fewer distinctive frequencies would be required. The transmitter portion of portable transceiver 14 sends distinctive frequencies to which the receiver of fixed transceiver 15 is tuned. Correspondingly, the receiver of portable transceiver 14 is tuned to the different distinctive frequencies which the transmitter of fixed transceiver 15 emits. Suitable distinctive coding techniques well known to those of ordinary skill in the art could be utilized for each transmitter to allow several transmitters to be operated in the same locality without interfering with each other. Additionally, it is desirable for portable transceiver 14 to be of the type that recharges its self-contained battery when placed in receptacle 30.

The first control feature of the present invention allows the user to start the engine of his vehicle without being required to enter it. Upon leaving the vehicle, the user removes portable transceiver 14, taking such portable transceiver with him. This, as described above, closes switches 23 and 17 and opens 27. Should the user desire to later preheat or precool the interior of the vehicle while he is away from the vehicle, he must manually actuate the corresponding heat or air conditioning switch before leaving the vehicle. Since these switches are well known to those of ordinary skill in the art, they have been omitted from the drawing to preserve clarity in the drawings. The user at a later time actuates the transmitter portion of portable transceiver 14 to send a first frequency signal. The signal sent by this transmitter will be received by the receiver of fixed transceiver 15. This signal upon receipt will, through an obvious circuit, such as a resonant relay, actuate a relay whose double contacts 2a and 2b will thereupon close. Closure of the upper contact 2a of contacts 2 actuates starter 11 in exactly the same manner, as is clearly evident from the drawing, as does closure by movement of key switch 1 to the lower of its contacts 1b, that is, by allowing current to flow from terminal +12v through contact 2a, closed contacts 16c and 16d to starter 11. Once the motor is running, current produced by alternator 12 will energize solenoid 10 to actuate movable switch arm 16, opening contacts 16c and 16d while closing contacts 16a and 16b in the manner hereinabove described, thus preventing further engagement of, and corresponding damage to, starter 11 and its flywheel.

Closure of contact 2b allows current to flow from terminal +12v through contact 2b to solenoid 4 to ground, thereby actuating solenoid 4 to move rod 36 and switch 6 in the manner hereinabove described closing contacts 6a and 6b, which contacts when closed allow current to flow from terminal +12v through contacts 6a and 6b, to contacts 25a and 25b, ignition coil 9 and to electrical ground.

Once the motor of the vehicle is running, the heater or air conditioner, if previously actuated by the user, of the vehicle can thereupon operate thereby adjusting the temperature of the interior of the vehicle to the desired level. Once the motor has started, current flows through contacts 16a and 16b, closed switch 17 to switch (with interrupter) 18, intermittently closing contacts 18a and 18b, energizing the transmitter portion of fixed transceiver 15 thereby enabling such transmitter to send a signal which will be received by the receiver portion of portable transceiver 14, thereby notifying the user that the motor of his vehicle has started.

If the motor fails to start upon closure of contact 2a, no current will flow from alternator 12, thus allowing current from terminal +12v to flow through bimetallic switch 7 and lamp 8. Flow of current through bimetallic switch 7 serves after a time delay to close contacts 7a and 7b, thereby allowing current to flow from terminal +12v to energize solenoid 5 which solenoid thereupon operates in the manner hereinabove set forth to interrupt the flow of current to ignition coil 9. Lamp 8 serves to give a visible indication while current is flowing through bimetallic switch 7 that the motor of the vehicle has failed to start. Bimetallic switch 7 does not interfere with the operation of the vehicle under control of ignition switch 1a, since the circuit path shown in the drawings passing thru contacts 25a and 25b still exists between ignition switch 1a and ignition coil 9.

The second control feature which the present invention makes available allows the user to stop the engine of his vehicle should he have started the engine by operation of portable transceiver 14 in the manner hereinabove set forth, and later decided that use of the vehicle is not required. The user actuates portable transceiver 14 to send a second frequency signal. The second signal will also be received by the receiver of fixed transceiver 15. This signal upon receipt, will through an obvious circuit, such as a resonant relay, actuate a relay whose contact 3 will close, thereby allowing current to flow from terminal +12v through contact 3 to energize solenoid 5 thereby causing solenoid 5 to operate upon rod 36 and switch arm 6 in the manner hereinabove set forth, interrupting at contacts 6a and 6b the flow of current energizing ignition coil 9.

Reinsertion of transceiver 14 into receptacle is another possible way to stop the motor of the vehicle once it has been started by operation of the first control feature. As hereinabove set forth, insertion of transceiver 14 into receptacle 30 actuates button 35 thereby closing contact 27 in the manner hereinabove set forth, and allowing current to flow from terminal +12v through contact 27 to solenoid 5, energizing solenoid 5, which operates in the manner hereinabove set forth to open contacts 6a and 6b. Should the owner have exercised the first control feature of the invention, and desire to reinsert transceiver 14 into receptacle 30 without stopping the engine, he first simply engages key switch 1 to contact 1a, thus allowing current to flow from terminal +12v through contact 1a, contacts 25a and 25b to ignition coil 9, thereby permitting subsequent reinsertion of transceiver 14 into receptacle 30 with attendant actuation of contact 27 energizing solenoid 5 to open contacts 6a and 6b without causing flow of current to ignition coil 9 to cease.

The third control feature of my device solves the problem of locating the owner's vehicle once it has been parked in a very large lot among numerous cars. After parking the vehicle and removing portable transceiver 14, the user upon returning and needing to locate the vehicle simply actuates the transmitter of portable transceiver 14 to send a third frequency signal. This signal is received by the receiver of fixed transceiver 15, causing operation, through an obvious circuit such as a resonant relay, of another relay, thereby closing contact 28. Closure of this contact can be used to actuate any of several devices to identify the location of the vehicle. As depicted in the drawing, horn 22 could be sounded. I have also found certain other type indicators to be useful. For example, closure of contact 28 could cause the radio antenna to rise. The antenna could be distinguished by some distinctive emblem or bulb attached to its top. The antenna motor would then be included in the circuit in place of the horn 22 depicted in the drawing. Another indicator particularly useful at night would be the vehicle's lights. The vehicle's lights are, if used for the location purposes of the present invention, inserted in the circuit in place of horn 22 between contact 28 and ground.

The foregoing disclosure and description of the invention are illustrative and explanatory thereof, and various changes in the size, shape, materials, wiring connections and contacts as well as in the details of the illustrated circuitry and construction may be made without departing from the spirit of the invention.

I claim:

1. A motor vehicle location system for assisting the user of such motor vehicle in locating the motor vehicle while the motor vehicle is one of many parked in a given location, comprising:
   a. portable transceiver means;
   b. a receptacle mounted with the motor vehicle, for receiving said portable transceiver;
   c. fixed transceiver means mounted with the motor vehicle and adapted to receive a signal from said portable transceiver means; and
   d. control means operable upon removal of said portable transceiver from said receptacle and responsive to said fixed transceiver means upon receipt of a signal from said portable transceiver means for giving a signal indicative of the location of said motor vehicle.

2. A control and safety system for use with a motor vehicle having an engine, an ignition circuit, and an emergency brake, operable by the user, comprising:
   a. portable transceiver means;
   b. a receptacle removably mounted to the vehicle, for receiving said portable transceiver; and
   c. first means operable upon removal of said portable transceiver from said receptacle whereby said control system is actuated, said first means being further operable upon replacement of said portable transceiver into said receptacle whereby said control system is disabled.

3. The structure of claim 2 including:
   a. second means to prevent engaging the starter of said vehicle when the engine of said vehicle is running.

4. The structure as set forth in claim 3 including:
   a. seventh means operable upon receipt of a signal from said portable transceiver to give a signal indicative of the location of said vehicle.

5. The structure as set forth in claim 3 including:
   a. eleventh means to interrupt the ignition circuit of said vehicle upon engagement of said vehicle in gear when the emergency brake of said vehicle is engaged.

6. The structure as set forth in claim 3 including:
   a. sixth means operable upon receipt of a second signal from said portable transceiver for terminating operation of the engine of said vehicle.

7. The structure as set forth in claim 3, including:
   a. third means operable upon receipt of a first signal from said portable transceiver for ignition of the engine of said vehicle.

8. The structure as set forth in claim 7 including:
   a. fixed transceiver means attached to said vehicle; and
   b. fourth means operable upon ignition of the engine of said vehicle to actuate said fixed transceiver, thereby signaling said portable transceiver of the operation of said vehicle engine to indicate operation of said vehicle engine.

9. The structure as set forth in claim 8 including:
   a. fifth means to interrupt the flow of electrical power to the ignition circuit of said vehicle upon failure of the engine of said vehicle to ignite.

10. The structure as set forth in claim 3 including:
    a. eighth means operable upon unauthorized movement of said vehicle to give an alarm indicative of said unauthorized movement.

11. The structure as set forth in claim 10 including:
    a. ninth means operable upon unauthorized attempts to move said vehicle to interrupt the ignition circuit of said vehicle so as to stop operation of said vehicle.

12. The structure as set forth in claim 11 including:
    a. tenth means operable to give audible indication of unauthorized attempt to move said vehicle.

13. The structure as set forth in claim 3 further including:
    a. fixed transceiver means attached to said vehicle;
    b. third means operable upon receipt of a first signal from said portable transceiver by said fixed transceiver means for ignition of the engine of said vehicle;
    c. fourth means operable upon ignition of the engine of said vehicle to actuate said fixed transceiver means, thereby signaling said portable transceiver of the operation of said vehicle engine to indicate operation of said vehicle engine; and
    d. sixth means operable upon receipt of a second signal from said portable transceiver by said fixed transceiver means for terminating operation of the engine of said vehicle.

14. The structure as set forth in claim 13 including:
    a. seventh means operable upon receipt of a third signal from said portable transceiver to give a signal indicative of the location of said vehicle.

15. The structure as set forth in claim 14 including:
    a. eighth means operable upon unauthorized movement of said vehicle to give an alarm indicative of said unauthorized movement.

16. The structure as set forth in claim 15 including:
    a. ninth means operable upon unauthorized attempts to move said vehicle to interrupt the ignition circuit of said vehicle so as to stop operation of said vehicle.

17. The structure as set forth in claim 16 including:
    a. tenth means operable to give audible indication of unauthorized attempt to move said vehicle.

18. The structure as set forth in claim 17 including:
    a. fifth means to interrupt the flow of electrical power to the ignition circuit of said vehicle upon failure of the engine of said vehicle to ignite.

* * * * *